United States Patent [19]

Cutts

[11] 4,137,945
[45] Feb. 6, 1979

[54] GAS TAP

[75] Inventor: Ronald G. Cutts, Highett, Australia

[73] Assignee: W. A. Deutsher Pty. Ltd., Moorabbin, Australia

[21] Appl. No.: 800,249

[22] Filed: May 25, 1977

[30] Foreign Application Priority Data

Jun. 1, 1976 [AU] Australia .................... 6126/76

[51] Int. Cl.² .................. F16K 5/10; F16K 35/02
[52] U.S. Cl. .................. 137/625.46; 251/96; 251/208
[58] Field of Search .................. 251/96, 208; 137/625.46

[56] References Cited

U.S. PATENT DOCUMENTS

| | | | |
|---|---|---|---|
| 2,989,082 | 6/1961 | Ray | 137/625.46 |
| 3,453,897 | 7/1969 | Adinolf | 251/96 |
| 3,693,874 | 9/1972 | Fox | 251/96 |

*Primary Examiner*—Martin P. Schwadron
*Assistant Examiner*—A. Michael Chambers
*Attorney, Agent, or Firm*—Jack R. Halvorsen; Robert W. Beart

[57] ABSTRACT

A gas tap comprising: a body portion, a housing, metering means and a control device, wherein said body portion includes an inlet port in gas communication with an inlet chamber and an outlet port, said metering means being adapted to be in gas communication with said inlet chamber and being operable, responsive to movement of said control device, to govern the amount and rate of gas flow from said inlet chamber to said outlet port.

10 Claims, 7 Drawing Figures

GAS TAP

FIELD OF THE INVENTION

This invention relates to gas taps and refers particularly, though not exclusively, to gas taps designed primarily for use in gas stoves.

Hitherto, most gas taps have been constructed using a tapered plug and cast brass gas cocks. Such gas taps have been both expensive to manufacture, because of the need for accurate machining of the respective elements involved, and have also suffered from inefficient operation by virtue of gas leakage, corrosion effects, etc.

It is therefore the principal object of the present invention to provide a gas tap which can be more economically manufactured and which is more efficient in operation.

DESCRIPTION OF THE INVENTION

It is a further object of this invention to provide a gas tap which is, by virtue of its principle of operation, effectively "child-proof". With the above and other objects in mind, the present invention provides a gas tap comprising: a body portion, a housing, metering means and a control device, wherein said body portion includes an inlet port in gas communication with an inlet chamber and an outlet port, said metering means being adapted to be in gas communication with said inlet chamber and being operable, responsive to movement of said control device, to govern the amount and rate of gas flow from said inlet chamber to said outlet port.

DESCRIPTION OF THE DRAWINGS

In order that the invention may be clearly understood there shall now be described a preferred construction of a gas tap incorporating the features of the present invention; the description being by way of non-limitative example only and with reference to the accompanying illustrative drawings.

In the drawings:

FIG. 1 is an end elevation of a gas tap in accordance with the present invention;

FIG. 2 is a vertical cross-section through the gas tap of FIG. 1, taken along the line of and in the direction of the arrows 2—2 of FIG. 1, with the gas tap being in the OFF position;

DESCRIPTION OF PREFERRED EMBODIMENT

Figure 3:
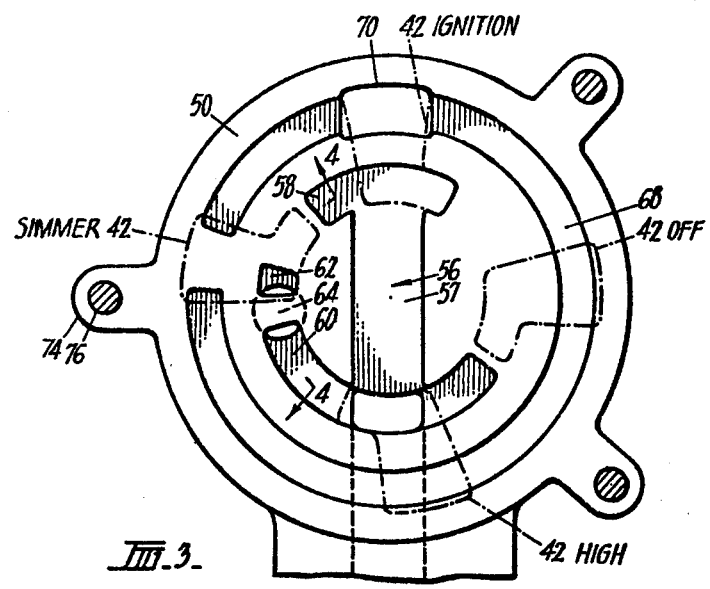
FIG. 3 is a vertical cross-section taken along the line of and in the direction of the arrows 3—3 of FIG. 2, showing in phantom outline the metering disc in four different operating positions, corresponding to the OFF, IGNITION, SIMMER and HIGH positions.
Figure 4:
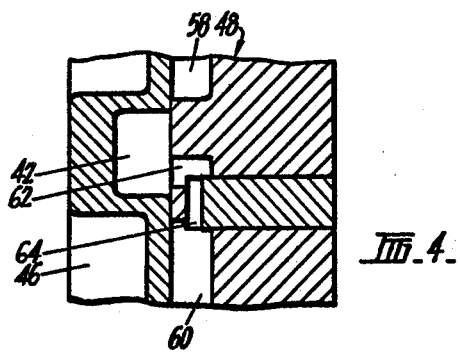
FIG. 4 is a partial cross-section taken along the line of and in the direction of the arrows 4—4 of FIG. 3, showing in more detail the working relationship between certain of the elements of the gas tap in accordance with the present invention.
Figure 5:
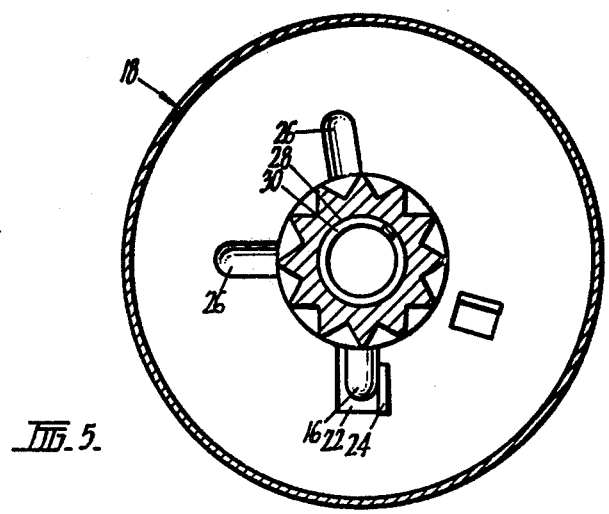
FIG. 5 is a vertical cross-section taken along the line of and in the direction of the arrows 5—5 of FIG. 2.

The gas tap illustrated has four main components, namely a knob 10, a metering disc 32, a housing 18 and a body 48.

The knob 10 is mounted on the outermost end of a spindle 12 which has, at its innermost end, an enlarged head portion having a number of splines 14 arranged around its outer surface and extending longitudinally thereof. Radially extending from the spindle 12 is an L-shaped tag 16 which has its outermost portion extending longitudinally forwardly in a direction towards the knob 10.

Tag 16 is arranged to be located in an opening 22 in housing 18, wherein it is in juxtaposed relation with an ear 24. Ear 24 is preferably formed by being pressed out of housing 18 whereby to form opening 22 and serves to act as a limit stop to prevent the knob 10 being turned beyond the OFF position.

Housing 18 also has a longitudinally outwardly extending flange 20 surrounding the spindle 12 at the outer regions thereof. This flange 20 serves to locate the outer regions of the spindle 12 in the radial direction and also acts as a form of bearing during the rotation of the knob 10. Located in an arcuate fashion about flange 20 are a number of recesses 26 in the housing 18 which serve as location marks for the various degrees of rotation of the knob 10, that is corresponding to different operating positions. The tag 16 is received in these recesses 26.

In order to bias the spindle 12 and knob 10 in the longitudinally outwards direction so as to maintain the tag 16 either in one of the recesses 26 or in opening 22, the spindle is provided with a hollow or blind hole 28 at its innermost end in which is located a compression spring 30.

The spring 30 also contacts the innermost surface of a central recess 34 provided in the metering disc 32. The central recess 34 has splines 36 arranged around its side walls, which splines co-operate with the splines 14 on spindle 12 so that rotation of knob 10 not only causes rotation of spindle 12 but also causes rotation of the metering disc 32.

As can be seen from the above, the knob 10 and spindle 12 would have to be moved longitudinally inwardly to remove the tag 16 from opening 22 or one of the recesses 26 before the knob 10 could be rotated. This constitutes a safety feature as the requirement of a push-plus-turn movement to operate the gas tap means that small children cannot play with the tap and either cause gas flow or change a gas flow from its existing rate.

Figure 6:
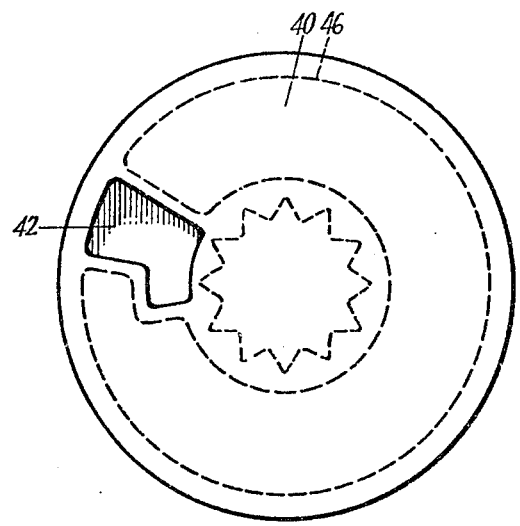
FIG. 6 is a view of a metering disc in accordance with the present invention taken from the direction of the inlet chamber.

The metering disc 32 has an outer surface 38 which tapers radially inwardly in the longitudinally outwardly direction. The disc 32 also has a front surface 44 and a rear surface 40. Recessed into the front surface 44 is an arcuate slot 46 which extends for a considerable portion around the front surface 44. Recessed into the rear surface 40 and off-set from slot 46 is an L-shaped recess 42 (see FIG. 6). The function of this recess 42 will be better understood from a reading of the following description.

The rear surface 40 of the metering disc 32 is located against and in sealing relationship with the front surface 50 of the body 48. These two surfaces 40 and 50 should then be the only two surfaces in the gas tap requiring moderately accurate machining. Such a result is in marked contrast to the prior art gas taps, which required extremely accurate machining for all interacting surfaces.

The body 48 has an inlet port 52 communicating between an inlet manifold 54 which supplies gas to the gas tap, and an inlet chamber 56 recessed into the front surface 50, of the body 48. The inlet chamber 56 (as shown in FIG. 3) has an elongate vertically oriented central portion 57, an upper arcuate portion 58 and a lower arcuate portion 60. A further portion of the inlet chamber 56 constitutes a simmer portion 62 which is connected to the remainder of the inlet chamber 56 by a tube 64 (hidden).

Also recessed into the front surface 50 of body 48, but located radially outwardly of the inlet chamber 56, is a groove 68 extending arcuately around the surface 50 for slightly less than 360°. This groove 68 has an enlarged portion 70 located radially above the upper portion 58 of the inlet chamber 56, which portion 70 is in direct communication with an outlet port 66 for supplying gas to an outlet manifold 72.

In order to secure the gas tap in position relative to a stove or the like, the body 48 is provided with three ears 74 having holes 76 therethrough (see FIG. 3).

Figures 1, 2:
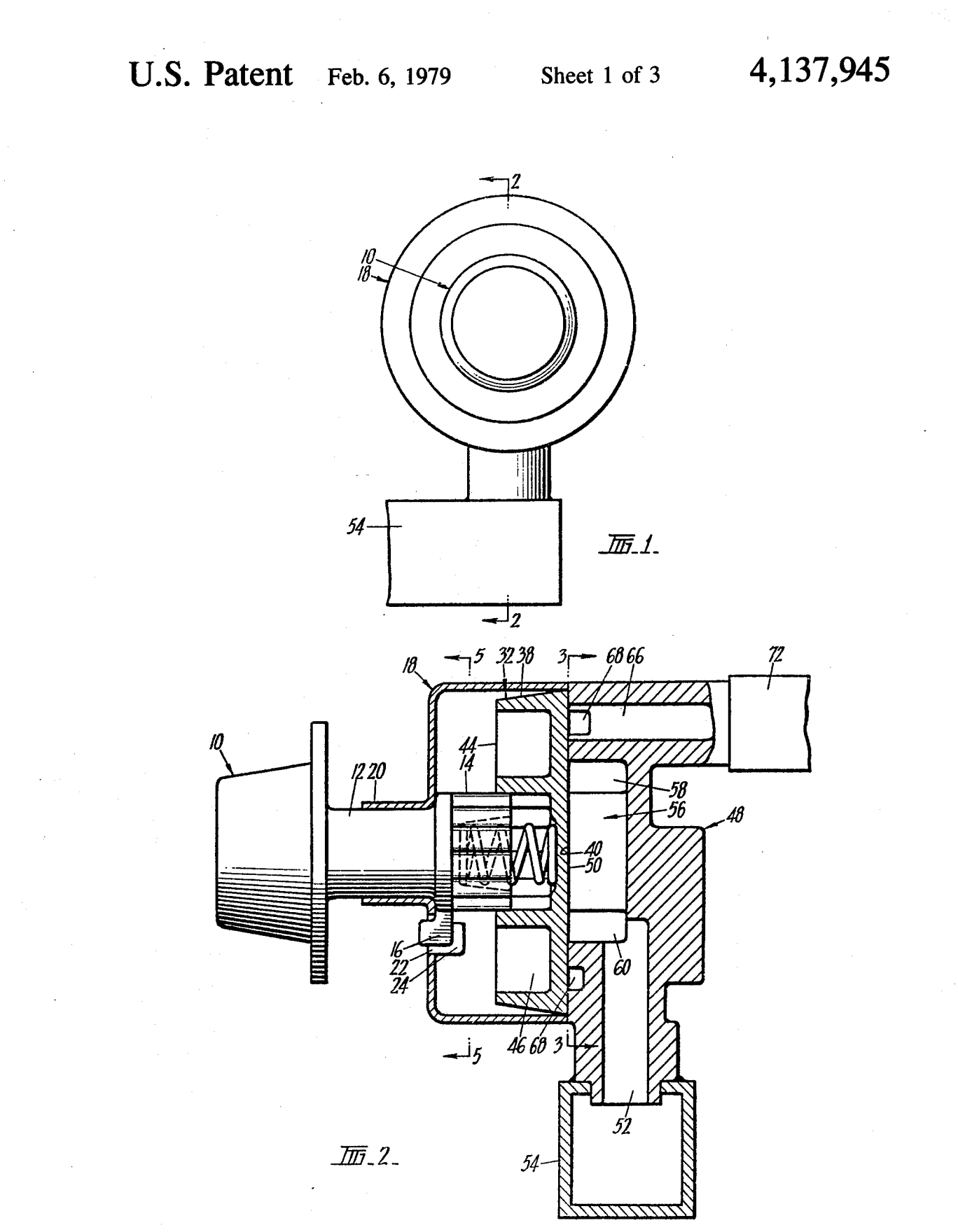
Figure 7:
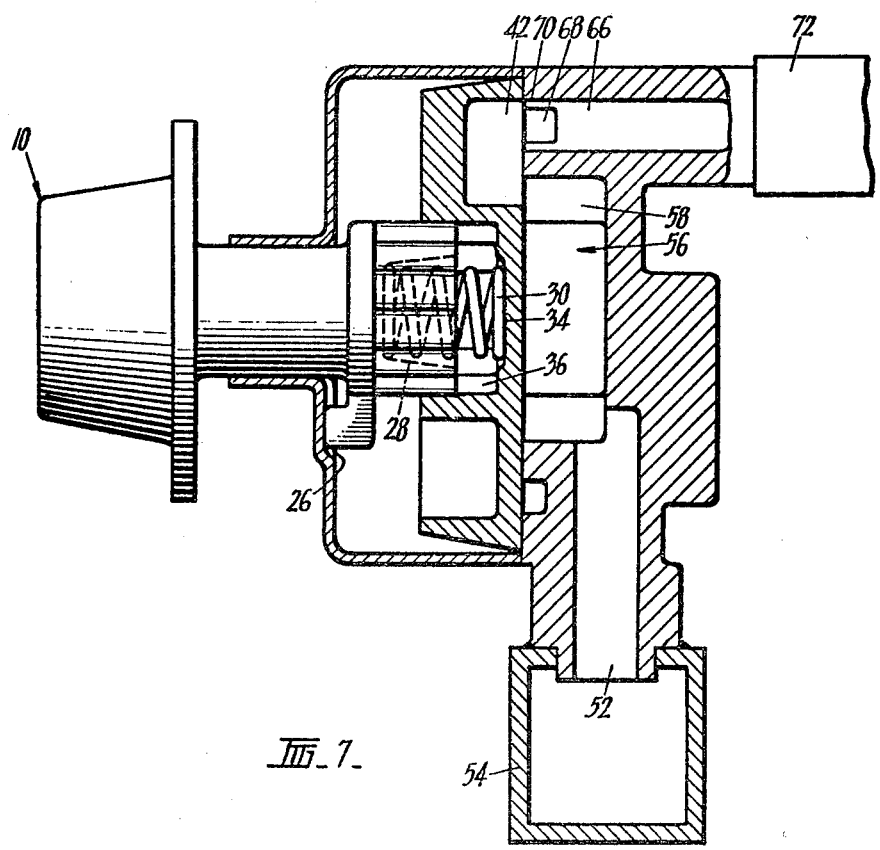
FIG. 7 is a vertical cross-section through the gas tap of FIG. 1, again taken along the line of and in the direction of the arrows 2—2 of FIG. 1, with the gas tap now being in the ON position.

The operation of the gas tap is as follows. Gas is supplied to the inlet chamber 56 via inlet port 52 and inlet manifold 54. The recess 42 then allows gas to flow into groove 68 and out through outlet port 66 when the metering disc 32 has been rotated to a position whereby the recess 42 is in gas flow communication with both the inlet chamber 56 and the groove 68. (FIG. 7). When the recess 42 is not in gas flow communication with both the groove 68 and the inlet chamber 56 then the gas cannot flow out from the inlet chamber 56 and hence there is no gas flow, the tap then being in the OFF position as shown in FIG. 2.

To refer now to FIG. 3, the recess 42 is shown therein in phantom outline in four different operating positions, designated OFF, IGNITION, SIMMER and HIGH respectively. In the OFF position the recess 42 is not in gas flow communication with any part of the inlet chamber 56. Hence no gas can flow to the outlet port 66 and the gas tap is inoperable. By rotating the knob 10 in an anticlockwise direction, the metering disc 32 will likewise rotate until the recess 42 is in gas flow communication with both the enlarged portion 70 of groove 68 and the upper portion 58 of inlet chamber 56. Due to the enlarged area of portions 58 and 70 therethrough the gas flow would be relatively large and hence this position would correspond to an IGNITION position for an automatic ignition stove or the like.

By further rotation of the knob 10 in the anticlockwise direction, the metering disc 32 will rotate further until the recess 42 is in communication with the simmering portion 62 of the inlet chamber 56 and in slight communication with the two ends of groove 68. Due to the relatively small areas of communication the gas flow would be relatively small and hence this position would correspond to a SIMMER or LOW position for a stove or the like.

Further anticlockwise rotation of the knob 10 would cause the metering disc 32 to proressively rotate until the recess 42 is in gas flow communication with the lower portion 60 of inlet chamber 56 adjacent central portion 57, as well as with groove 68. Due to the moderately large communication area the gas flow would be moderately large and hence this position would correspond to a HIGH position in a stove or the like.

It has been found in practice that the gas flow increase is approximately linear between the LOW and the HIGH positions.

Clearly, the configurations of groove 68 and inlet chamber 56 may be altered to give differing locations for the different gas flow positions.

Whilst there has been described in the foregoing description a preferred construction of a gas tap according to the present invention it will be understood by those skilld in the art that many variations or modifications in details of design or construction may be made without departing from the essential nature of the invention as will be understood from a fair reading of the foregoing.

I claim:

1. A gas tap comprising: a body portion, a housing, metering means and a control device, wherein said body portion includes an inlet port in gas communication with an inlet chamber and an outlet port, said metering means being adapted to be in gas communication with said inlet chamber and being operable, responsive to movement of said control device, to govern the amount and rate of gas flow from said inlet chamber to said outlet port, said inlet chamber of said body portion comprising an elongated central portion, arcuate portions at each end of said central portion, and a further smaller portion separate from but in gas communication with said central elongated portion.

2. A gas tap as claimed in claim 1 wherein said metering means comprises a disc, having front and rear surfaces, centrally mounted in said housing and rotatable in response to movement of said control device, said metering disc and said body portion being in juxtaposed relationship, the rear surface of said disc being positioned in sealing relationship adjacent a front surface of said body portion, said front surface of said body portion having a recessed groove provided thereon, said groove being located radially outwardly of said inlet chamber and extending arcuately around substantially the entirety of said front surface, said groove being in flow communication with said outlet port.

3. A gas tap as claimed in claim 2 wherein said front surface of said metering disc is relieved to reduce material by means of a slot extending around a substantial portion of said front surface, while said rear surface of said metering disc includes an L-shaped recess offset from said slot.

4. A gas tap as claimed in claim 3, wherein said rear surface of said metering disc includes an L-shaped recess offset from said slot.

5. A gas tap as claimed in claim 3, and wherein said metering disc is rotatable responsive to movement of said control device whereby to bring said L-shaped recess of said disc into communication with both said groove on said body portion and said inlet chamber, whereby to allow for gas flow into said groove and out through said outlet port.

6. A gas tap as claimed in claim 1, wherein said control device comprises a knob mounted on one end of a spindle, with said other end of said spindle having an enlarged head portion thereon, said head portion having a plurality of splines extending longitudinally thereof.

7. A gas tap as claimed in claim 6, wherein said metering disc is adapted for location on said enlarged splined head portion of said spindle.

8. A gas tap as claimed in claim 5, wherein, dependent on the relative position of said metering disc and said body portion, the area of communication of said L-shaped recess on said disc with said groove and said inlet chamber is varied, whereby to govern the amount and rate of gas flow from said inlet chamber to said outlet port via said L-shaped recess and said groove.

9. A gas tap as claimed in claim 7, wherein said metering disc is provided with a central recess for receiving said spindle, said central recess having a plurality of splines thereon for co-operating with said splines on said spindle.

10. A gas tap as claimed in claim 6, wherein said spindle includes lug means projecting therefrom and engageable with recesses provided on said housing whereby to retain said metering device in preselected operating positions.

* * * * *